(12) United States Patent
Kim et al.

(10) Patent No.: US 8,952,676 B2
(45) Date of Patent: Feb. 10, 2015

(54) TRANSMITTING AND RECEIVING ELECTRODE SYSTEM AND POWER TRANSMISSION METHOD USING THE SAME

(75) Inventors: Youn-Tae Kim, Daejeon (KR); Kun-Ho Park, Jeollanam-do (KR); Jang-Myoung Kim, Gwangju (KR); Min-Joo Jeong, Gwangju (KR); Chang-Hee Hyoung, Daejeon (KR); Jung-Hwan Hwang, Daejeon (KR); Sung-Weon Kang, Daejeon (KR)

(73) Assignee: Industry-Academic Cooperation Foundation, Chosun University (KR)

( * ) Notice: Subject to any disclaimer, the term of this patent is extended or adjusted under 35 U.S.C. 154(b) by 138 days.

(21) Appl. No.: 13/454,614

(22) Filed: Apr. 24, 2012

(65) Prior Publication Data

US 2013/0265026 A1  Oct. 10, 2013

(30) Foreign Application Priority Data

Apr. 6, 2012 (KR) ........................ 10-2012-0036072

(51) Int. Cl.
G05F 3/04 (2006.01)

(52) U.S. Cl.
USPC ........... 323/370; 323/218; 323/233; 323/911; 363/140

(58) Field of Classification Search
CPC ..................................... G05F 3/04; G05F 1/12
USPC .......... 363/140; 323/208, 218, 233, 293, 352, 323/364, 370
See application file for complete search history.

(56) References Cited

U.S. PATENT DOCUMENTS

| | | | |
|---|---|---|---|
| 6,291,999 B1 * | 9/2001 | Nishimori et al. | 324/464 |
| 7,489,145 B2 * | 2/2009 | Matoba et al. | 324/707 |
| 2008/0158927 A1 * | 7/2008 | Omae et al. | 363/165 |
| 2009/0191824 A1 | 7/2009 | Williams et al. | |
| 2009/0302690 A1 * | 12/2009 | Kubono et al. | 307/109 |
| 2010/0045446 A1 | 2/2010 | Hyun et al. | |
| 2011/0241643 A1 * | 10/2011 | Iino | 323/293 |
| 2012/0250370 A1 * | 10/2012 | Taniguchi et al. | 363/34 |

FOREIGN PATENT DOCUMENTS

| | | |
|---|---|---|
| JP | 2003-143086 | 5/2003 |
| KR | 1020080088727 | 10/2008 |
| KR | 100942706 | 2/2010 |

* cited by examiner

*Primary Examiner* — Gary L Laxton
(74) *Attorney, Agent, or Firm* — The Farrell Law Firm, P.C.

(57) ABSTRACT

A transmitting and receiving electrode system, and power transmission method using the same are provided. The transmitting and receiving electrode system includes: a voltage/current detection unit measuring a voltage and a current in real time while power is being transmitted between first and second electrodes; a controller calculating a variable element value based on the voltage and current values transferred from the voltage/current detection unit; and a variable element unit converting a variable element under the control of the controller to adjust an impedance of a power source.

6 Claims, 3 Drawing Sheets

TRANSMITTING AND RECEIVING ELECTRODE SYSTEM AND POWER TRANSMISSION METHOD USING THE SAME

CROSS-REFERENCE TO RELATED APPLICATIONS

This application claims priority to Korean Patent Application No. 10-2012-0036072 filed on Apr. 6, 2012, in the Korean Intellectual Property Office, the disclosure of which is incorporated herein by reference.

BACKGROUND OF THE INVENTION

1. Field of the Invention

The present invention relates to a transmitting and receiving electrode system and a power transmission method using the same, and more particularly, to a transmitting and receiving electrode system capable of minimizing loss of reflected energy in transmitting power by adjusting an impedance of a power source according to a phase difference between a voltage and a current measured in real time, and a power transmission method using the same.

The present invention is derived from research conducted as a part of CRH for Human, Cognition and Environment-new technology fusion-type growth power industrial technology development work supported by the Ministry of Education, Science and Technology [Project Management No.: 2011K000662, Project title: Development of High Speed Human Body Communication and Human Body Medium Power Transmission Technique].

2. Description of the Related Art

When power is transmitted to a human body through a transmitting and receiving electrode system, impedance of the human body is changed in real time due to various factors, and accordingly, reflection loss occurs due to a difference between the impedance unique to the human body and that of the system.

SUMMARY OF THE INVENTION

Thus, a scheme of minimizing reflection loss in transmitting power to a human body by using a transmitting and receiving electrode system to thus enhance power transmission efficiency is required.

According to an aspect of the present invention, there is provided a transmitting and receiving electrode system. The transmitting and receiving electrode system may include: a voltage/current detection unit measuring a voltage and a current in real time while power is being transmitted between first and second electrodes; a controller calculating a variable element value based on the voltage and current values transferred from the voltage/current detection unit; and a variable element unit converting a variable element under the control of the controller to adjust an impedance of a power source.

The controller may include: a variable element value calculation unit comparing a time difference between peak values of the voltage and the current with a previously configured table to calculate the variable element value; and a control signal output unit outputting a control signal corresponding to the variable element value calculated by the variable element value calculation unit to the variable element unit.

The previously configured table may include an optimal region and a plurality of adjacent regions according to the voltage/current peak value time differences, and a variable element value for switching to the optimal region may be defined according to a region in which the voltage/current peak value time difference is included.

A range of the optimal region, a range of each of the adjacent regions, and the number of the adjacent regions in the previously configured table may be adjustable according to accuracy of impedance adjustment and complexity of a configuration of the variable element unit.

According to another aspect of the present invention, there is provided a power transmission method. The power transmission method may include: detecting a voltage and a current between first and second electrodes; checking whether or not a time difference between peak values of the detected voltage and current is included in an optimal region of a previously configured table; when the time difference between peak values of the detected voltage and current is included in an optimal region, outputting a control signal for converting a variable element; converting a variable element according to the control signal to adjust an impedance of a power source; and applying power between the first and second electrodes.

The method may further include: when the time difference between peak values of the detected voltage and current is not included in an optimal region, detecting a region in which the voltage/current peak value time difference is included; and outputting a control signal for converting a variable element corresponding to the detected region.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
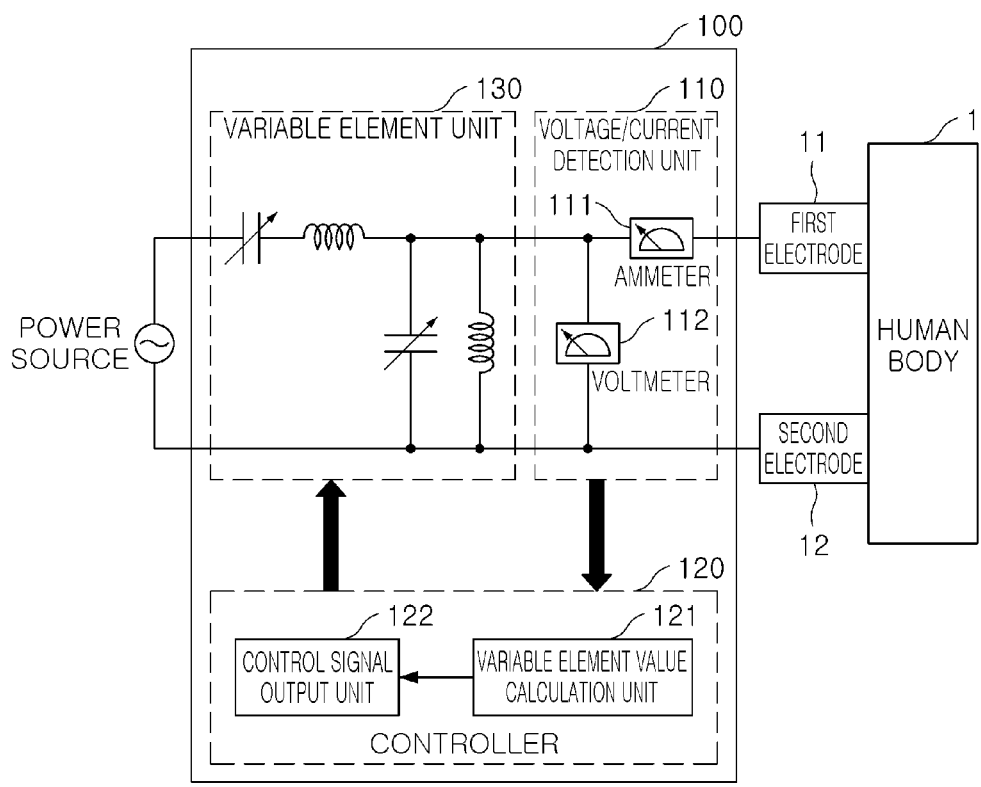
FIG. 1 is a schematic block diagram of a transmitting and receiving electrode system according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

In addition, it will be understood that when an element is referred to as being "connected to" another element, it can be directly connected to the other element or intervening elements may also be present. In contrast, when an element is referred to as being "directly connected to" another element, there are no intervening elements present.

FIG. 1 is a schematic block diagram of a transmitting and receiving electrode system according to an embodiment of the present invention.

With reference to FIG. 1, a transmitting and receiving electrode system 100 according to an embodiment of the present invention may include a voltage/current detection unit 110, a controller 120, and a variable element unit 130.

The voltage/current detection unit 110 serves to measure a voltage and a current travelling through a human body while power is being transmitted between a first electrode 11 and the second electrode 12. The voltage/current detection unit 110 may include an ammeter 111 for measuring a current and a voltmeter 112 for measuring a voltage.

Here, the voltage/current detection unit 110 measures a voltage and a current in real time while power is being transmitted, and transfers the results to the controller 120.

The controller 120 calculates an optimum variable element value based on the voltage and current values received from the voltage/current detection unit 110 and controls the variable element unit 130 accordingly. The controller 120 may include a variable element value calculation unit 121 and a control signal output unit 122.

The variable element value calculation unit 121 compares peak value time differences between the voltage and the current to calculate a variable element value that allows for an optimum time difference. To this end, the variable element value calculation unit 121 configures a table (to be described with reference to FIG. 2) and calculates an optimum variable element value according to a phase difference that changes in real time with reference to the table.

The control signal output unit 122 outputs a control signal, corresponding to the variable element value calculated by the variable element value calculation unit 121, to the variable element unit 130.

The variable element unit 130 converts a variable element according to the control signal received from the controller 120 to adjust an impedance of a power source.

Figure 2:
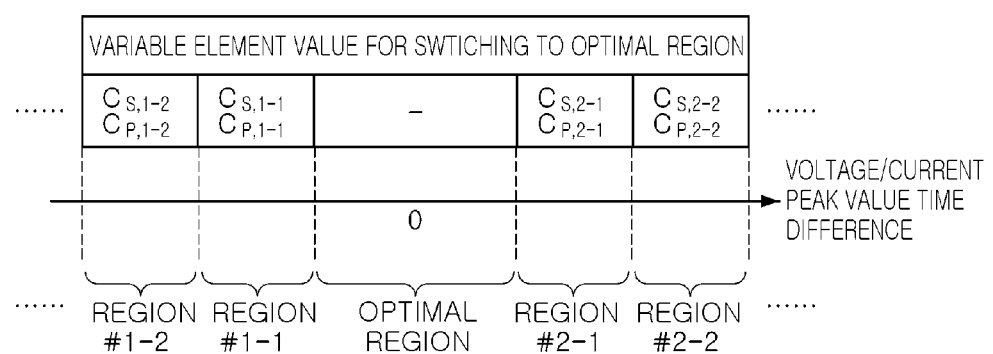
FIG. 2 is a view showing a structure of a table configured to calculate variable element values allowing for an optimum voltage/current peak value time difference according to an embodiment of the present invention.

FIG. 2 is a view showing a structure of a table configured to calculating variable element values in order to allow for an optimum voltage/current peak value time difference according to an embodiment of the present invention.

According to an embodiment of the present invention, in order to calculate a variable element value to allow for an optimum voltage/current peak value time difference, the variable element value calculation unit 121 configures the table as shown in FIG. 2 through a measurement in advance before power is applied.

With reference to FIG. 2, the table includes an optimal region and a plurality of adjacent regions according to voltage/current peak value differences, and variable element values for switching to the optimal region are defined according to the regions in which the voltage/current peak value time differences are included.

Here, the element values of the respective regions are uniform, so impedance values thereof are fixed, respectively. Thus, when the range of each region is reduced to increase the number of the regions, impedance can be adjusted for various voltage/current peak value time differences.

However, as the number of regions is increased, the range of the element values is widen, making the configuration of the variable element unit 130 complicated.

Thus, the range of the optimal region, the number of adjacent regions, and the range of each region are required to be appropriately adjusted in consideration of accuracy of impedance adjustment and complexity of the configuration of the variable element unit 130.

Figure 3:
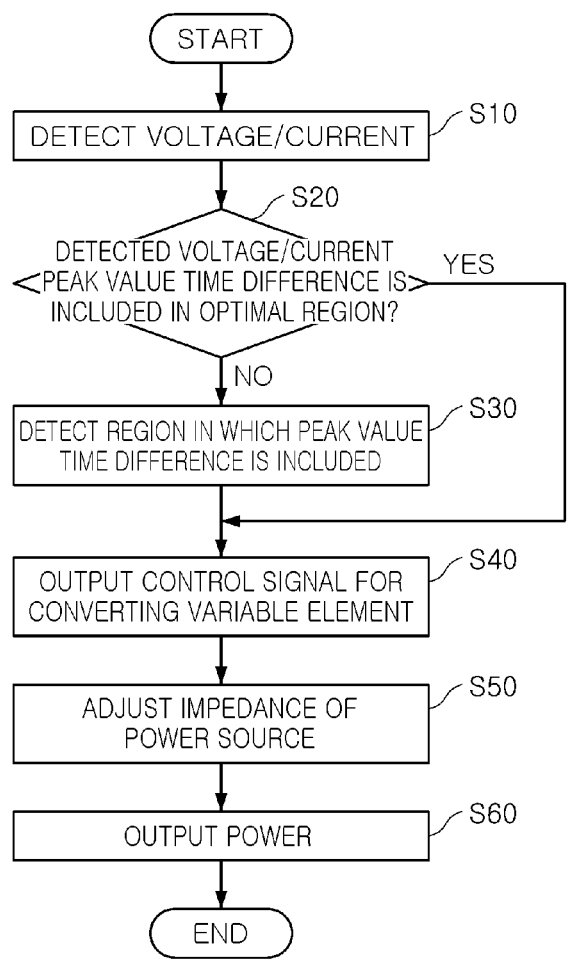
FIG. 3 is a flow chart illustrating a process of a method of transmitting power according to another embodiment of the present invention.

FIG. 3 is a flow chart illustrating a process of a method of transmitting power according to another embodiment of the present invention.

With reference to FIG. 3, first, the voltage/current detection unit 110 detects a voltage and a current between the first electrode 11 and the second electrode 12 and transfers corresponding results to the controller 120 (S10).

Thereafter, the controller 120 checks whether or not a time difference between peak values of the detected voltage and current is included in the optimal region in a previously configured table (S20).

According to the check results, when the voltage/current peak value time difference is included in the optimal region, the controller 120 outputs a control signal for converting a variable element to the variable element unit 130 (S40).

Meanwhile, when the voltage/current peak value time difference is not included in the optimal region, the controller 120 detects a region in which a voltage/current peak value time difference is included (S30), and outputs a control signal for converting a variable element to the variable element unit 130 accordingly (S40).

Thereafter, the variable element unit 130 converts a variable element according to the control signal to adjust an impedance of the power source (S50), and then, applies power (S60).

According to an embodiment of the present invention, the foregoing respective steps are repeatedly performed while power is being applied in order to adjust an impedance of the power source according to a phase difference between a voltage and a current changing in real time, thus transmitting an optimal amount of power each time.

As set forth above, according to embodiments of the invention, impedance of the power source is adjusted according to a phase difference between a voltage and a current measured in real time, thereby minimizing loss of reflected energy in transmitting power.

While the present invention has been shown and described in connection with the embodiments, it will be apparent to those skilled in the art that modifications and variations can be made without departing from the spirit and scope of the invention as defined by the appended claims.

What is claimed is:

1. A transmitting and receiving electrode system comprising:
   a voltage/current detection unit measuring a voltage and a current in real time while power is being transmitted between first and second electrodes;
   a controller calculating a variable element value based on the voltage and current values transferred from the voltage/current detection unit; and
   a variable element unit converting a variable element under the control of the controller to adjust an impedance of a power source,
   wherein the variable element value has a time difference between peak values of the voltage and the current included in an optimal region of a previously configured table.

2. The transmitting and receiving electrode system of claim 1, wherein the controller comprises:
   a variable element value calculation unit comparing the time difference between the peak values of the voltage and the current with the previously configured table to calculate the variable element value; and
   a control signal output unit outputting a control signal corresponding to the variable element value calculated by the variable element value calculation unit to the variable element unit.

3. The transmitting and receiving electrode system of claim 2, wherein the previously configured table includes the optimal region and a plurality of adjacent regions according to voltage/current peak value time differences, and the variable element value for switching to the optimal region is defined according to a region in which the voltage/current peak value time difference is included.

4. The transmitting and receiving electrode system of claim 3, wherein a range of the optimal region, a range of each of the adjacent regions, and the number of the adjacent regions in the previously configured table are adjustable according to accuracy of impedance adjustment and complexity of a configuration of the variable element unit.

5. A power transmission method comprising:
    detecting a voltage and a current between first and second electrodes;
    checking whether or not a time difference between peak values of the detected voltage and current is included in an optimal region of a previously configured table;
    when the time difference between peak values of the detected voltage and current is included in the optimal region, outputting a control signal for converting a variable element;
    converting the variable element according to the control signal to adjust an impedance of a power source; and
    applying power between the first and second electrodes.

6. The method of claim 5, further comprising:
    when the time difference between peak values of the detected voltage and current is not included in the optimal region, detecting a region in which the voltage/current peak value time difference is included; and
    outputting a control signal for converting the variable element corresponding to the detected region.

* * * * *